United States Patent Office 3,055,865
Patented Sept. 25, 1962

3,055,865
PROCESS OF PREPARING FILM-FORMING COMPOSITIONS
Willis G. Craig, Willoughby, Ohio, assignor to The Lubrizol Corp., Wickliffe, Ohio, a corporation of Ohio
No Drawing. Filed Aug. 22, 1960, Ser. No. 50,844
12 Claims. (Cl. 260—47)

This invention relates to the protection of metal surfaces, especially ferrous metal surfaces. It relates still more particularly to the protection of such surfaces from corrosion and in the case of ferrous metal surfaces, from the formation of rust. It relates also to an improved means for the bonding of paint to metal surfaces and to the protection of painted metal surfaces.

The susceptibility of bare metal surfaces to deterioration upon continued exposure to the atmosphere in an important industrial problem. The necessity of storing finished and semi-finished metal articles for periods of time in environments which give rise to such deterioration demands that some protection be afforded the surfaces of these metal articles. Ferrous goods are especially vulnerable to the formation of rust and the inhibition or prevention of such rust formation is frequently important.

The product of the process described herein is notably effective to provide protection of exposed metal surfaces from deterioration such as corrosion and rust formation. A thin film of this product applied to the surface of a metal article frequently is all that is necessary to afford complete protection from such corrosion or rust formation. This thin film likewise is an efficient primer for the subsequent application of paint and in such cases it acts to bond the paint film tightly to the metal surface. Furthermore, in this latter application the product of the process described herein serves to provide an additional type of protection to the painted metal surface by preventing the spread of rust beneath the paint film when the paint film has been ruptured as by scoring, etc. Thus if a painted metal surface, previously treated with the product of the process described herein, is scored so as to leave bare a portion of the metal surface, and then subjected to conditions of accelerated corrosion, only the exposed metal surface, i.e., which is not protected by the paint film, will be corroded. The area of corrosion will not spread beneath the paint film. On the other hand a painted metal surface which has not previously been treated with the product of the process described herein, will not be thus protected. If such a painted surface is scored and then exposed to the same conditions of accelerated corrosion the scored area will corrode first, but the corrosion will spread almost immediately to areas beneath the paint film.

Solutions to such problems have most frequently been sought among inorganic chemicals, i.e., protective films or coatings of inorganic chemicals or mixtures of inorganic chemicals have been applied to metal surfaces in an effort to provide satisfactory protection from corrosion. Such protective films and coatings have been quite satisfactory with respect to the degree of protection afforded thereby, but they have suffered from one significant disadvantage having to do with the application of these films and coatings to the metal surfaces. Such applications have invariably been made by means of aqueous solutions of the inorganic compounds, either by spraying or immersion. These aqueous solutions are characterized inevitably by much sludge formation and the materials which form this sludge represent a considerable proportion of the inorganic chemicals used in formulating the solution. The sludge of course is a total loss as far as the purpose or objectives of the formulated solution and in many cases this loss is as much as 85 percent of the inorganic chemicals used. Rarely is it less than 65 or 70 percent. Thus the use of inorganic chemicals in providing a protective film for metal surfaces is only about 70 to 85 percent efficient.

It is accordingly an object of this invention to provide protection from corrosion to metal surfaces.

It is another object of this invention to provide such protection by means of an improved, more efficient process.

It is still another object of this invention to provide a protective coating for metal surfaces which is an effective bonding agent for paint.

Still another object of the present invention is the protection of painted metal surfaces which have been defaced or scored.

These and other objects, which will be apparent from the following description, are accomplished by the process of preparing a film-forming composition comprising mixing phosphorus pentoxide, from about 0.2 to about 12.5 moles of a copolymer of allyl alcohol and a styrene, and from about 0.3 to about 5.0 moles of an alkyl phenol, and heating said mixture at a temperature within the range of from about 75° C. to about 150 C.

Ordinarily the reaction is carried out in a solvent and the solvent then removed by distillation when the reaction is completed. Suitable solvents for this reaction include xylene, benzene, cyclohexane, chlorobenzene, ethylene dichloride and dioxane. Other inert, relatively volatile solvents (so as to afford easy removal from the product mixture) may be used. The reaction also may be carried out without a solvent and in such cases there is the obvious advantage of not having to remove the solvent when the reaction is completed.

The reaction of the process, although its mechanism is not known, may involve first a reaction between phosphorus pentoxide and the copolymer of allyl alcohol and a styrene, followed then by reaction of this intermediate product with the alkyl phenol. Presumably this latter reaction is a transesterification. The reaction mixture is at first cloudy and viscous, but as it proceeds the cloudiness and viscosity disappear and the final product mixture is a relatively clear solution. The optimum reaction time is about four to six hours although a suitable product can be obtained at any point within a period of from about one to about ten hours.

The copolymer of allyl alcohol and a styrene preferably is a low molecular weight copolymer prepared from an approximately equimolar mixture of the two monomers. The molecular weight of the copolymer should be within the range of from about 750 to about 1,500. The styrene monomer may be styrene itself, and most usually is, and it may also be any of the various substituted styrenes such as monochlorstyrene, alkyl-substituted styrenes and alpha-substituted styrenes in which latter the substituent is an alkyl group, preferably methyl.

The alkyl phenol reactant may be either a mono-alkyl or poly-alkyl phenol. The alkyl groups may be of either size, ranging from methyl up to alkyl groups derived from olefin polymers having molecular weights as high as 50,000. Preferably the alkyl phenol is a mono-alkyl phenol in which the alkyl group contains from one to about ten carbon atoms.

The process is carried out simply by mixing the specified reactants, preferably with a solvent, and heating the resulting solution at a temperature within the range of from about 75° C. to 150° C. until the reaction is complete. As indicated before the earlier stages of the overall reaction produce a cloudy, thickened reaction mixture and as the reaction proceeds further this is changed to a relatively clear, non-viscous solution. An illustrative example is as follows:

A mixture of 1,412 grams (1.2 moles) of a 1:1 (molar)

copolymer of allyl alcohol and styrene having an average molecular weight of 1,100, 168 grams (1.0 mole) of tert-amyl phenol, 68 grams (0.5 mole) of phosphorus pentoxide and 1,648 grams of xylene (an inert solvent) was prepared at room temperature and then heated at reflux (141° C.) for six hours. The reaction mixture was stirred throughout this period. At the end of this time the xylene was removed by distillation to yield a plastic, non-viscous mass. This residue, while still hot, i.e., about 100° C., was diluted with 824 grams of isobutyl alcohol.

The dilution of the final product above is for the purpose of preparing it for application to a metal surface. In most cases such application of the product of the process of this invention is made by way of a solution thereof in an organic solvent. Such solution may be applied by spraying, brushing or dipping and then allowing the solvent to evaporate from the metal surface either at room temperature or at elevated temperatures. A butyl alcohol, usually isobutyl alcohol, is preferred for this purpose although many other solvents such as isopropyl alcohol, the amyl acohols, diethyl ether, di n-butyl ether, diisopropyl ether, acetone, methyl ethyl ketone, methyl isobutyl carbinol, benzene and xylene may be used. Mixtures of such solvents may be used also.

In some instances it is desirable to employ the same solvent in which the reaction of the process is carried out as is intended to be used as the vehicle from which the reaction is deposited on a metal surface. Thus in the example above the xylene used as the solvent for the reaction could be retained in the final product mixture and the resulting xylene solution of the product used to coat a metal surface.

Although the principal use of the product of the process of this invention is the coating of ferrous metal surfaces it has been observed that a coating of this product is quite effective to protect also the surfaces of other metals. It affords such protection from corrosion of brass, copper, galvanized iron, and aluminum and the scope of this invention contemplates its applicability to all metal surfaces which are susceptible to corrosion.

An indication of the effectiveness of the compositions of this invention in providing protection to metal surfaces is shown by the results of tests carried out on treated and untreated brass, copper and galvanized iron surfaces. The test procedure is that of the Navy Research Test for resistance to corrosion under conditions of high humidity. Brass, copper and galvanized iron panels are suspended in a cabinet filled to a depth of 12 inches with water. The temperature within the cabinet is 100° F. and the humidity is maintained at 100 percent by bubbling air at 5 lbs. per square inch pressure into the water. The resistance of the individual test panels to corrosion is measured in terms of the time in hours of exposure required to produce visible deterioration. In the following tables (I–IV) the indicated protective coating material was prepared as in the example above except of course that the ratio of reactants and the alkyl phenol used differed as shown in the tables.

A comparison of the results shown for Sample 1 and Sample 3 demonstrates quite clearly the protection afforded brass surfaces by a coating of the composition of this invention. Similarly a comparison of the test results for Samples Nos. 2 and 4 illustrates such protection for copper surfaces. The test results for Samples Nos. 5 and 6 shows that galvanized iron surfaces are protected also by a coating of this sort. A comparison of the results for Samples Nos. 7 and 8 indicates the benefits in the form of paint adhesion afforded by such a protective coating. The painted metal surface without a "primer" of the product of the process of this invention showed up very poorly whereas the painted metal surface which had such a "primer" was much better.

*Table II*

| Sample | Protective coating (molar ratio of copolymer: alkyl phenol:$P_2O_5$) | Weight of protective coating, mg./sq.ft. | Humidity test results, hours | Salt-fog test results, hours |
|---|---|---|---|---|
| 1 | None; surface sand blasted | | 1 | 1 |
| 2 | None; surface treated with alkaline cleanser. | | 1 | 1 |
| 3 | (Amyl phenol) (0.87:16.2:4) | 100–155 | 25 | 6 |
| 4 | (Amyl phenol) (0.8:12:4) | 100–155 | 24 | 4.8 |
| 5 | (Amyl phenol) (1.8:12:4) | 100–155 | 17 | 5 |
| 6 | (Heptyl phenol) (5:12:4) | 500 | [1] 336 | |
| 7 | (Cresol) (5:12:4) | 500 | 144 | |
| 8 | (Polyisobutyl [2] phenol-cresol)[3] (5:12:4). | 500 | 56 | |
| 9 | (Nonyl phenol) (5:12:4) | 500 | 216 | |
| 10 | (Polyisobutyl [2] phenol) (5:12:4). | 500 | [1] 336 | |

[1] Test discontinued, no failure.
[2] Derived from polyisobutylene having an average molecular weight of 350.
[3] 1:5 ratio.

The data of Table II shows additional humidity test results and also salt-fog test results for treated and untreated steel panels. The "salt-fog test" is carried out in the same apparatus employed in the humidity test described above. A 5 percent aqueous sodium chloride solution is substituted for the water of that test so that the resulting environment in which the test panels are suspended is much more corrosive, the temperature being 95° F. and the humidity 100 percent. The performance characteristics of a test panel are evaluated by removing the panel for inspection at hourly intervals and stopping the test when rust formation is detected. The test results then are expressed in terms of hours of exposure to the environment of this test required to produce rust.

It will be noted from Table II that neither of Samples Nos. 1 and 2, containing no protective coating, survived more than one hour either in the humidity test or this salt-fog test. Samples Nos. 3, 4 and 5 on the other hand, containing 100–155 mg./sq. ft. of a coating of products prepared as described herein, showed up quite well in each of these tests. Thus the treated steel panels lasted 25, 24 and 17 hours respectively in the humidity test and 6, 4.8 and 5 hours respectively in the salt-fog test. Furthermore, Samples Nos. 6–10 showed up even better, Nos. 6 and 10 performing especially well.

*Table I*

| Sample | Protective coating (molar ratio of copolymer: amyl phenol:$P_2O_5$) | Metal | Weight of protective coating | Humidity test results |
|---|---|---|---|---|
| 1 | None | Brass | None | 168 hrs. Completely tarnished. |
| 2 | do | Copper | do | Do. |
| 3 | (10.3:8.6:4) | Brass | 120 mg./sq. ft. | 408 hrs. No tranish. |
| 4 | (10.3:8.6:4) | Copper | 120 mg./sq. ft. | Do. |
| 5 | (5:12:4) | Galvanized iron | 75 mg./sq. ft. | 770 hgs. No corrosion. |
| 6 | (5:12:4) | do | 75 mg./sq. ft. | 1,680 hrs. 20% light corrosion. |
| 7 | None, painted with an alkyd enamel | do | | 794 hrs. Poor adhesion of enamel with 50% of panel blistered. |
| 8 | (5:12:4) painted with the alkyd enamel of Sample No. 7. | do | 75 mg./sq. ft. | 794 hrs. Excellent adhesion of enamel, no blistering. |

Table III

| Sample | Protective coating (molar ratio of copolymer: alkyl phenol:P₂O₅) | Salt-fog paint adhesion test results (percent of paint remaining on test panel) | |
|---|---|---|---|
| | | Containing 100-155 mg./ft.² | Containing 290-430 mg./ft.² |
| 1 | None, cleansed by sand blasting | 28.5 | |
| 2 | None, cleansed with alkaline cleanser | 1.5 | |
| 3 | (Amyl phenol) (0.8:12:4) | 69.2 | |
| 4 | (Amyl phenol) (3.75:16:4) | 82.5 | 82.2 |
| 5 | (Amyl phenol) (4:12:4) | 87.5 | 85.6 |
| 6 | (Amyl phenol) (5:8:4) | 77.5 | 91.1 |
| 7 | (Amyl phenol) (10.6:4:4) | 46.7 | 89.4 |
| 8 | (Amyl phenol) (24.2:4:4) | 73.9 | 67.2 |
| 9 | (Amyl phenol) (8:12:4) | 81.4 | 87.2 |
| 10 | (Heptyl phenol) (5:12:4) | 48 | |
| 11 | (Cresol) (5:12:4) | 81 | |
| 12 | (Polyisobutyl* phenol:cresol)** (5:12:4). | 81 | |
| 13 | (Nonyl phenol) (5:12:4) | 67 | |
| 14 | (Polyisobutyl* phenol) (5:12:4) | 67 | |

*Derived from polyisobutylene having an average molecular weight of 350.
**1:5 ratio.

Table III shows the results obtained from the Salt-Fog Paint Adhesion Test. This test, identified as ASTM B117-54T, measures the adhesion of paint to a metal surface in terms of the percentage of paint remaining on a scored metal surface after five days of exposure to the environment, described above, of the salt-fog test. This test is identical with that indicated in Table II except that it is carried out for five days and the results are expressed in terms of the percentage of paint remaining on the painted metal surface of the panel. It will be noted that in every case in which the panel was treated with the compositions of this invention prior to the application of paint (Samples Nos. 3-14) the retention of paint on the steel panel was far greater than in either of the two cases (Samples Nos. 1 and 2) in which there was no such application of a "primer."

The test panel used in this Salt-Fog Paint Adhesion Test is first scored so as to leave the metal surface of the steel panel bare along a line extending to within one inch of the top and bottom of the panel. Then at the conclusion of a five-day test period the panels are scraped with a one-inch putty knife to remove all loose paint (caused by "undercutting" and/or blistering).

Samples Nos. 3-14 were in each case cleaned by sand blasting and treatment with an alkaline cleanser prior to application of the protective coating and subsequent application of paint.

Table IV

| Sample | Protective coating (molar ratio of copolymer: alkyl phenol:P₂O₅) | Reverse impact test results (inch-pounds) | |
|---|---|---|---|
| | | Containing 100-155 mg./ft.² | Containing 290-430 mg./ft.² |
| 1 | None, cleaned by sand blasting | 30 | |
| 2 | None, cleaned with alkaline cleanser | 14 | |
| 3 | (Amyl phenol) (5:16:4) | 160 | |
| 4 | (Amyl phenol) (4:12:4) | 160 | |
| 5 | (Amyl phenol) (10.1:12:4) | 160 | 110 |
| 6 | (Amyl phenol) (21.2:12:4) | 158 | 160 |
| 7 | (Amyl phenol) (10.6:4:4) | 160 | 160 |
| 8 | (Amyl phenol) (48.5:12:4) | 158 | 160 |
| 9 | (Amyl phenol) (24.2:4:4) | 160 | 160 |
| 10 | (Amyl phenol) (48:4:12) | 160 | |
| 11 | (Heptyl phenol) (5:12:4) | 157 | |
| 12 | (Cresol) (5:12:4) | 159 | |
| 13 | (Polyisobutyl* phenol:cresol)** (5:12:4) | 159 | |
| 14 | (Polyisobutyl* phenol) (5:12:4) | 160 | |

*Derived from polyisobutylene having an average molecular weight of 350.
**1:5 molar ratio.

Still another advantage imparted to painted metal surfaces which have, prior to painting, been treated with the protective coating of this invention, is the resistance of such painted metal surfaces to flaking and rupture of the painted surface upon impact. This property is demonstrated quite clearly by the Reverse Impact Test, the results of which are set forth in Table IV. This test employs the Gardner variable impact tester in which the test panel is placed horizontally over a ⅝ inch diameter hole in a base plate. A 2-lb. steel rod, rounded at the bottom, is dropped from a specified height (in inches) through a graduated tube so that it strikes the test panel over the ⅝ inch hole in the base plate. The height from which the steel rod is dropped on the test panel is increased until the panel "dimples" and causes the paint film to flake or crack. The greatest height from which this steel rod is dropped and leaves the paint film unruptured is taken as a measure of the paint film's resistance to impact. The test results are expressed in terms of inch/lbs., i.e., calculated by multiplying the height in inches by the weight in lbs. of the steel rod. The particular equipment used in this case is capable of measuring impact resistance up to 160-inch lbs. Either side of the impacted test panel may be inspected for failure of the paint film, but the convex side of the "dimple" produces failure first. All of the test data reported in Table IV are based upon an inspection of the convex side of the "dimple" of test panels, thus the name "Reverse Impact Test."

Each of the test panels represented by Samples Nos. 1-14 of Table IV was painted with the same alkyd baked enamel. Sample No. 1 first was cleaned by sand blasting and then painted with this enamel. Sample No. 2 was cleaned with an alkaline cleanser and then painted with this enamel. It will be noted that each of these test panels scored relatively poorly, i.e., 30 and 14-inch lbs. respectively. Thus when the 2-lb. steel rod was dropped from a height of 8 inches onto the test panel which was Sample No. 2, the paint film on the reverse side of the panel was ruptured.

The test panels of Samples Nos. 3-14, however, scored quite well. Many of them retained an intact paint film even under the maximum impact available from the test apparatus, i.e., 160-inch lbs. The superiority of a painted steel surface which has first been treated with the protective coating of this invention is quite apparent.

Other modes of applying the principle of the invention may be employed, change being made as regards the details described, provided the features stated in any of the following claims or the equivalent of such be employed.

I, therefore, particularly point out and distinctly claim as my invention:

1. The process of preparing a film-forming composition comprising mixing one mole of phosphorus pentoxide, from about 0.2 to about 12.5 moles of a copolymer of allyl alcohol and a styrene, and from about 0.3 to about 5.0 moles of an alkyl phenol, and heating said mixture at a temperature within the range of from about 75° C. to about 150° C.

2. The process of claim 1 characterized further in that the ratio of monomer units in the copolymer of allyl alcohol and a styrene is about 1:1.

3. The process of claim 1 characterized further in that the average molecular weight of the copolymer to allyl alcohol and a styrene is about 1100.

4. The process of claim 1 characterized further in that the copolymer of allyl alcohol and a styrene has a ratio of monomer units of about 1:1 and an average molecular weight of about 1100.

5. The process of claim 1 characterized further in that the alkyl phenol is an amyl phenol.

6. The process of claim 1 characterized further in that the ratio of reactants is about 3 moles of a copolymer of allyl alcohol and a styrene and about 1 mole of an alkyl phenol per mole of phosphorus pentoxide.

7. The process of preparing a film-forming composition comprising mixing one mole of phosphorus pentoxide, about 3 moles of a copolymer of allyl alcohol and a styrene, said copolymer having an approximately 1:1 ratio of monomer units and an average molecular weight of about 1100 and about 1 mole of an alkyl phenol, and heating said mixture at a temperature within the range of from about 75° C. to about 150° C.

8. A film-forming composition prepared by the process of claim 1.

9. A film-forming composition prepared by the process of claim 7.

10. The process of depositing a solid film on a metallic surface from a solution in a volatile organic solvent of a product prepared by the process of claim 1.

11. The process of depositing a solid film on a metallic surface from a solution in a volatile organic solvent of a product prepared by the process of claim 7.

12. The process of depositing on a ferrous metal surface a solid film of a product prepared by the process comprising mixing one mole of phosphorus pentoxide, from about 0.2 to about 12.5 moles of a copolymer of allyl alcohol and a styrene, and from about 0.3 to about 5.0 moles of an alkyl phenol, and heating said mixture at a temperature within the range of from about 75° C. to about 150° C., which comprises dissolving said product in a low molecular weight aliphatic alcohol to form a solution, applying said solution to said ferrous metal surface and allowing the low molecular weight aliphatic alcohol to evaporate therefrom leaving a solid film.

References Cited in the file of this patent

UNITED STATES PATENTS

| | | |
|---|---|---|
| 2,005,619 | Graves | June 18, 1935 |
| 2,894,938 | Chapin | July 14, 1959 |